Jan. 17, 1939.　　　G. W. RUDA　　　2,144,229
CENTRIFUGAL SEPARATOR
Filed Jan. 9, 1935　　　2 Sheets-Sheet 1

WITNESS:

INVENTOR
Gustaf Wilhelm Ruda
BY
ATTORNEYS.

Jan. 17, 1939.　　　G. W. RUDA　　　2,144,229
CENTRIFUGAL SEPARATOR
Filed Jan. 9, 1935　　　2 Sheets-Sheet 2

INVENTOR
Gustaf Wilhelm Ruda
BY
Busser & Harding
ATTORNEYS.

WITNESS:

Patented Jan. 17, 1939

2,144,229

UNITED STATES PATENT OFFICE 2,144,229

CENTRIFUGAL SEPARATOR

Gustaf Wilhelm Ruda, Stockholm, Sweden, assignor to The De Laval Separator Company, New York, N. Y., a corporation of New Jersey Application January 9, 1935, Serial No. 954
In Sweden June 16, 1934

7 Claims. (Cl. 233—46)

In separators of the type in which the separated liquids are thrown out from the separator bowl and collected in collecting vessels, air is admixed with the discharging liquid, and causes a considerable froth, so that the separated liquid becomes less suitable for subsequent treatment. This condition is particularly characteristic of the centrifugal separation of milk.

In so-called closed separators, the separated liquids are discharged from the bowl without passing through any air layer. Liquids separated in this way are practically free from froth, whereas after separation in separators provided with free outlets 40 to 50% of froth is not unusual.

In the separation of milk it is especially the skim milk that has a tendency for formation of froth. The tendency of the cream to form froth is not so pronounced, and in many cases the cream discharged from bowls provided with open outlets is in satisfactory condition. Moreover, a substantial aeration of the cream may be useful and desirable and this aeration occurs when the cream discharges freely.

The present invention is one adapted to prevent froth formation in the skim milk without avoiding such limited froth formation in the cream as is consistent with a desirable degree of aeration.

The invention also has for its object the provision of controllable means to allow recirculation of skim milk through the separator.

The invention also has for its object to provide such construction and arrangement of the parts of a centrifugal machine as will cause the revolving separator bowl to act as a suction pump for the liquid to be separated.

The invention also comprises certain novel structural features whereby the above objects are most efficiently attained.

Figures 1, 2:
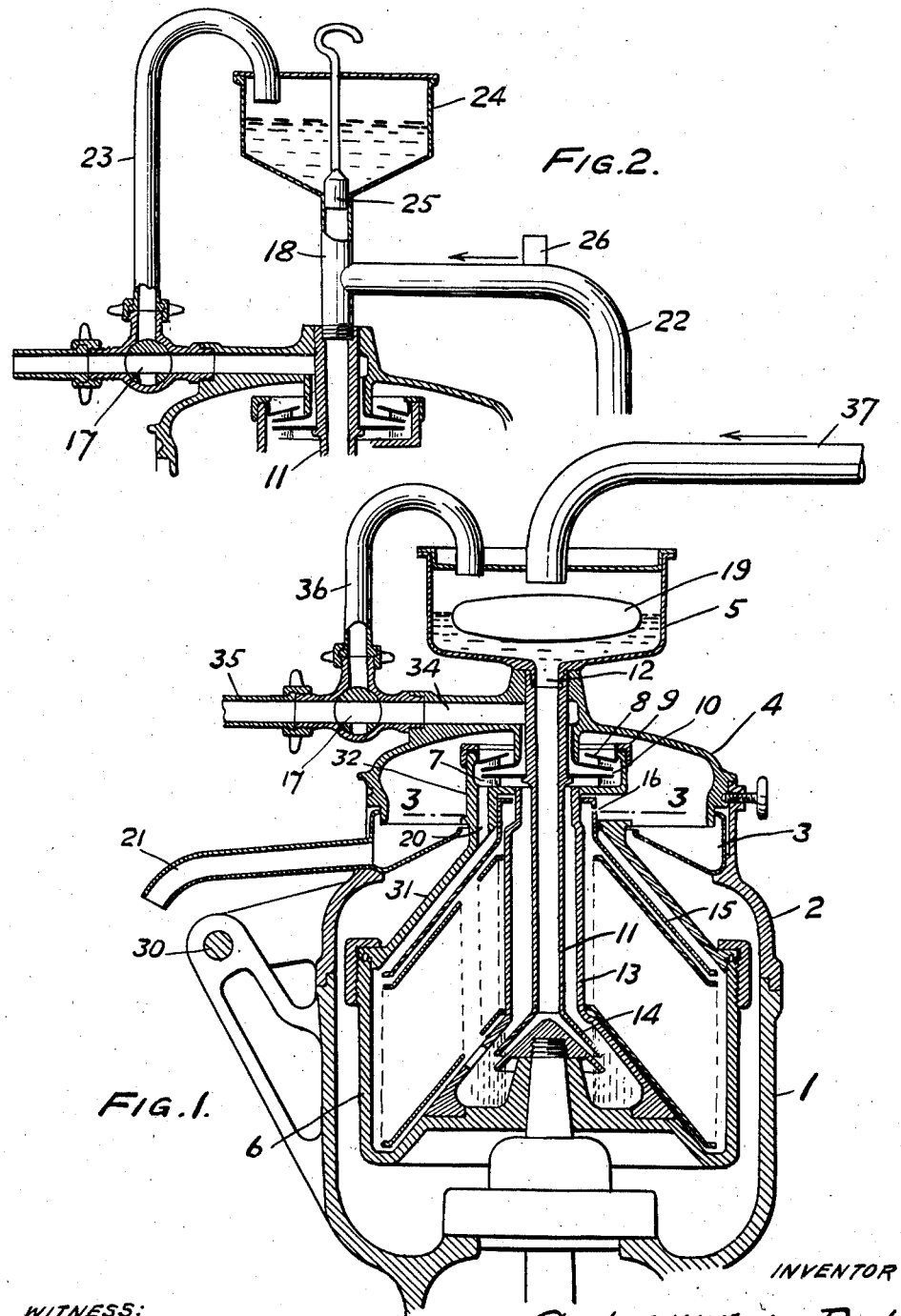
Fig. 1 is a longitudinal sectional view of a centrifugal separating machine embodying my invention.
Fig. 2 is a longitudinal sectional view of the upper part of a modification of Fig. 1.

Referring to Fig. 1: the main frame body 1 is provided with a cover 2 which may be hinged thereto at 30 and in which the collecting vessel 3 for the cream is arranged. Over the latter is a top cover 4 on which is mounted a regulating vessel 5, containing a float 19 and receiving whole milk through a supply pipe 37. The covers 2 and 4 are maintained in rigid connection with the frame by screws or clamps. The bowl body 6 has a cover or hood 31 having an upstanding neck 32, carried by which is a collecting vessel 7 for the skim milk. Vessel 7 is covered by a lid 8 held in place by the lock ring 9. The skimmer device 10, which is fixed to the top cover 4, projects into the chamber 7 and is maintained in position by the tension of the central milk inlet tube 11, into which the nozzle 12 of the regulating vessel 5 is threaded. If the whole milk fed in through the feed tube 11 passes through an air-layer in the distributor 13 of the bowl 6, and if the distributor communicates with the outer atmosphere, air is sucked in and causes a formation of froth in the cream and the skim milk. To prevent this source of froth formation, the lower part of the milk feed tube 11 is provided with a flange 14 having so large a diameter that, during separation, it projects into the body of milk contained in the bowl or in the enlarged lower part of the distributor from which the bowl is directly fed. In this way a liquid sealed passage is formed between the feed tube 11 and the separator bowl 6.

Figure 3:
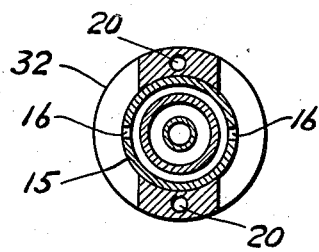
Fig. 3 is a cross-section on the line 3—3 of Fig. 1.
Figure 4:
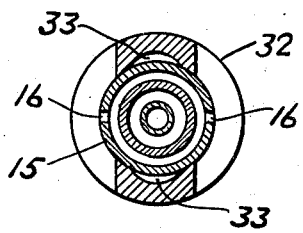
Fig. 4 is a cross-sectional view of a modification of the elements shown in Fig. 3.

The cream separated out in the bowl is conducted into the neck of the top disc 15 to outlets 16 therein located below the collecting chamber 7 for the skim milk. To obtain a free passage for the cream to the collecting vessel 3, the bowl neck is milled through immediately in front of outlets 16. See Fig. 3. In this figure the channels 20 for conducting the skim milk to the vessel 7 are formed entirely within the bowl neck 32. In Fig. 4 similar channels 33 are formed by grooves in the inner wall of the bowl neck 32, which are closed by the neck of the top disc 15.

For regulating the percentage of cream the skim milk outlet is provided with a regulating valve 17, which is preferably of such construction that it can also be used as a reversing valve, which is necessary for generating a circulation of liquid through the bowl. In Fig. 1 this valve is shown as a three-way valve located at the junction of channel 34 communicating with the skimmer 10, a skim milk discharge pipe 35, and a skim milk return pipe 36 communicating with the whole milk supply vessel 5. This combined regulating and reversing valve is provided with three-way openings of such areas relative to the diameter of the valve casing and the areas of the three openings therein that it is possible to so position the valve as to maintain a predetermined counter-pressure in the skim milk channel 34 and skimmer 10 while at the same time it cannot be turned into such position as to shut off outflow of skim milk or so as to so greatly throttle the flow as to cause the skim milk to overflow the inner edge of the collecting vessel 7.

The whole milk is fed into the regulating vessel 5 through the supply tube 37. The float 19 maintains a fixed level in the regulating vessel so that the supply of liquid into the bowl is constant. The milk flows from the regulating vessel 5 through the feed tube 11 down into the separator bowl 6. The skim milk is conducted between the top disc 15 and the bowl hood 31 up to the channels 20, which open into the collecting chamber 7. The skim milk is discharged from the collecting chamber 7 by the skimmer device 10. The counter-pressure in the discharge pipe, and thus the cream percentage, are regulated by the valve 17.

The cream discharges through the outlets 16 in the top disc and is collected in the collecting vessel 3, whence it flows out through the spout 21.

In another embodiment of the invention shown in Fig. 2, feed tube 11, or an extension 18 thereof, is connected airtightly with a pipe line 22 running to the milk container (not shown). If, in this embodiment, a flange 14 is provided on the lower end of the supply tube 11, or if a closed communication between the separator bowl 6 and the feed tube 11 is established by means of a liquid seal or tightening arranged in any other way, a self-sucking separator bowl is obtained, and a whole-milk pump need not be used. In order to obtain the vacuum in the supply tube which is necessary for the suction, the valve 17 should be adjusted to connect the skim milk outlet with a return tube, or circulation tube, 23, which is tightly connected with a vessel 24 having a funnel communicating with extension 18 of feed tube 11. When the separation is started so much liquid is filled into the bowl through the funnel 24 that the circulation commences. When the circulation has continued for such time that the liquid flowing through the bowl has brought away so much air that the vacuum in the pipe line 22 has become sufficiently great to suck liquid from the container, the valve 17 is reversed and the funnel 24 is shut off from pipe 18 by a valve 25. In order that the throughput shall be constant a constant vacuum must be maintained in the suction pipe. This is obtained by providing the suction pipe 22 with an air valve 26, which is adjusted for a given vacuum.

Figure 5:
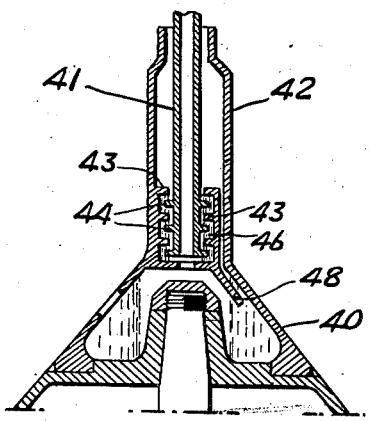
Fig. 5 is a longitudinal sectional view of a part of a separator comprising a modified construction for sealing the bowl against ingress of air.

In Fig. 5 is shown an alternative construction for providing a liquid seal between the feed pipe and the separator bowl. 40 is the expanded lower end of the distributor 42, which is provided with inwardly projecting lateral flanges 43 alternating with outwardly projecting lateral flanges 44 on the feed tube 41; these flanges extending into a chamber 46 integral with or secured to the distributor 42. This chamber communicates at its lower end with the feed tube 41 and with the expanded lower end of the distributor, from which the bowl (not shown) is fed. Skim milk from the feed tube fills this chamber to the extent required to cover the overlapping ends of the flanges. The chamber 46, which is spaced, throughout part of its circumference, from the inner wall of the distributor 42, is provided with a skirt 48 extending outward beyond the normal level of the liquid in the expanded lower end of the distributor. By means of this construction, liquid seals are provided, effective to exclude admission of air into the separator bowl.

While, in describing the invention, I have assumed the separation of whole milk into cream and skim milk, it will be understood that the invention is not limited to such separation, as it may be utilized to equal advantage in the separation of the constituents of other mixtures. The details of construction described may also be varied, within the scope of the appended claims, without departing from my invention.

What I claim and desire to protect by Letters Patent is:

1. A centrifugal separator comprising a rotatable bowl, a bowl feed having a portion adapted to be surrounded by liquid in the bowl and thereby cut off from communication with the atmosphere, a skimmer by means of which one of the separated liquids is removable from the bowl, a discharge channel communicating with said skimmer, a discharge pipe and a return pipe, the latter communicating with said bowl feed, and a three-way valve positioned at the junction of said channel and said pipes by means of which the liquid outflowing through said channel may be diverted from the discharge pipe to said bowl feed, the areas of the valve openings and the diameter of the valve casing being so proportioned as to enable the valve to be positioned to maintain a predetermined counter-pressure in said channel.

2. A centrifugal separator comprising a rotatable bowl, a bowl feed, a skimmer by means of which one of the separated liquids is removable from the bowl, a discharge channel communicating with said skimmer, a discharge pipe and a return pipe, the latter communicating with said bowl feed, and a three-way valve positioned at the junction of said channel and said pipes by means of which the liquid outflowing through said channel may be diverted from the discharge pipe to said bowl feed, said valve and the openings controlled thereby being so proportioned as to prevent such substantial closure of the valve as would create a counter-pressure in the channel and skimmer exceeding a predetermined maximum.

3. A centrifugal separator comprising a rotatable bowl, a bowl feed, means to maintain a liquid seal preventing communication between the liquid conveyed by the bowl feed and the atmosphere, a skimmer by means of which one of the separated liquids is removable from the bowl, a connection between the skimmer and the bowl feed adapted to be closed, and a suction pipe communicating with the bowl feed and adapted to convey thereto liquid mixtures to be separated, whereby the rotating bowl is adapted to act as a suction pump for the liquid to be separated.

4. A centrifugal separator in accordance with claim 3 wherein said closed connection comprises a pipe, a receiver provided with a funnel and a valve adapted to close communication between the funnel and the bowl feed.

5. A centrifugal separator in accordance with claim 3 including also a regulating valve for maintaining a constant pressure in the suction pipe.

6. A centrifugal separator in accordance with claim 3 including also an outlet pipe for said separated liquid and a valve by means of which said separated liquid may be diverted through said connection.

7. A centrifugal separator comprises a rotatable bowl, a bowl feed for liquid mixtures to be separated, means to maintain a liquid seal connecting the liquid conveyed by the bowl feed and the liquid in the bowl and preventing the entrance of gases, a skimmer by means of which one of the separated liquids is removable from the bowl, a discharge channel communicating with said skimmer, a discharge pipe and a return pipe, the latter communicating with said bowl feed, and means to convey to either pipe the separated liquid conveyed by the skimmer to said channel.

GUSTAF WILHELM RUDA.